(12) United States Patent
Baker et al.

(10) Patent No.: US 8,514,764 B2
(45) Date of Patent: Aug. 20, 2013

(54) REPEATER THAT REPORTS DETECTED NEIGHBORS

(75) Inventors: Kenneth Baker, Boulder, CO (US);
Charles Wheatley, Del Mar, CA (US);
Daniel Willis, Lafayette, CO (US);
Leonid Sheynblat, Hillsborough, CA (US)

(73) Assignee: QUALCOMM Incorporated, San Diego, CA (US)

( * ) Notice: Subject to any disclaimer, the term of this patent is extended or adjusted under 35 U.S.C. 154(b) by 965 days.

(21) Appl. No.: 10/534,416

(22) PCT Filed: Apr. 30, 2004

(86) PCT No.: PCT/US2004/013202
§ 371 (c)(1),
(2), (4) Date: Jul. 30, 2007

(87) PCT Pub. No.: WO2005/104573
PCT Pub. Date: Nov. 3, 2005

(65) Prior Publication Data
US 2008/0062906 A1 Mar. 13, 2008

Related U.S. Application Data

(60) Provisional application No. 60/559,545, filed on Apr. 5, 2004.

(51) Int. Cl.
*H04B 7/155* (2006.01)
(52) U.S. Cl.
USPC .............................. 370/315; 455/15

(58) Field of Classification Search
USPC ................................ 455/456, 11.1; 370/33.1
See application file for complete search history.

(56) References Cited

U.S. PATENT DOCUMENTS

| 3,670,249 A | 6/1972 | Meslener |
| 4,723,320 A | 2/1988 | Horton |
| 4,901,307 A | 2/1990 | Gilhousen et al. |
| 4,993,021 A | 2/1991 | Nannicini et al. |

(Continued)

FOREIGN PATENT DOCUMENTS

| EP | 0651360 | 3/1995 |
| EP | 0822674 A1 | 2/1998 |

(Continued)

OTHER PUBLICATIONS

International Search Report—International Search Authority—PCT/US04/13202—Nov. 3, 2005.

(Continued)

*Primary Examiner* — Phuoc Doan
(74) *Attorney, Agent, or Firm* — Thien T. Nguyen

(57) ABSTRACT

This disclosure is directed to a repeater and base station control device implemented in a wireless communication system. The repeater includes a control unit capable of detecting signals sent from various base stations in the wireless communication system. In accordance with this disclosure, the repeater identifies a set of base stations that it can detect, and then sends information indicative of the set of base stations that the repeater can detect to a specific base station that gets repeated by the repeater. In this manner, the repeater can be used to help assess network topology. The base station control device receives the information from the base station and can use the information to update a neighbor list.

30 Claims, 4 Drawing Sheets

(56) References Cited

U.S. PATENT DOCUMENTS

| | | | |
|---|---|---|---|
| 5,056,109 | A | 10/1991 | Gilhousen et al. |
| 5,103,459 | A | 4/1992 | Gilhousen et al. |
| 5,210,632 | A | 5/1993 | Murakami et al. |
| 5,355,511 | A | 10/1994 | Hatano et al. |
| 5,383,219 | A | 1/1995 | Wheatley, III et al. |
| 5,396,516 | A | 3/1995 | Padovani et al. |
| 5,416,468 | A | 5/1995 | Baumann |
| 5,440,418 | A | 8/1995 | Ishimura et al. |
| 5,507,452 | A | 4/1996 | Mayersak |
| 5,608,393 | A | 3/1997 | Hartman |
| 5,626,630 | A | 5/1997 | Markowitz et al. |
| 5,646,630 | A | 7/1997 | Sheynblat et al. |
| 5,812,933 | A | 9/1998 | Niki |
| 5,815,795 | A | 9/1998 | Iwai |
| 5,910,943 | A | 6/1999 | Wickman |
| 5,991,345 | A | 11/1999 | Ramasastry |
| 6,052,558 | A | 4/2000 | Cook et al. |
| 6,108,364 | A | 8/2000 | Weaver, Jr. et al. |
| 6,118,809 | A | 9/2000 | Lo |
| 6,147,981 | A | 11/2000 | Prescott |
| 6,185,429 | B1 | 2/2001 | Gehrke et al. |
| 6,188,719 | B1 | 2/2001 | Collomby |
| 6,266,008 | B1 | 7/2001 | Huston et al. |
| 6,272,316 | B1 | 8/2001 | Wiedeman et al. |
| 6,307,504 | B1 | 10/2001 | Sheynblat |
| 6,317,420 | B1 | 11/2001 | Schiff |
| 6,346,911 | B1 | 2/2002 | King |
| 6,347,216 | B1 | 2/2002 | Marko et al. |
| 6,349,211 | B2 | 2/2002 | Koshima et al. |
| 6,377,792 | B1 | 4/2002 | Brown et al. |
| 6,404,775 | B1 | 6/2002 | Leslie et al. |
| 6,415,155 | B1 | 7/2002 | Koshima et al. |
| 6,429,808 | B1 | 8/2002 | King et al. |
| 6,430,415 | B1 | 8/2002 | Agashe et al. |
| 6,501,955 | B1 | 12/2002 | Durrant et al. |
| 6,507,741 | B1* | 1/2003 | Bassirat ............ 455/440 |
| 6,515,975 | B1 | 2/2003 | Chheda et al. |
| 6,615,021 | B1 | 9/2003 | Lovinggood et al. |
| 6,690,657 | B1 | 2/2004 | Lau et al. |
| 6,757,263 | B1* | 6/2004 | Olds ............ 370/315 |
| 6,788,663 | B2 | 9/2004 | Rowitch |
| 6,889,033 | B2 | 5/2005 | Bongfeldt |
| 6,901,264 | B2 | 5/2005 | Myr |
| 6,901,268 | B2 | 5/2005 | Chang |
| 6,999,778 | B2 | 2/2006 | DiBuduo |
| 7,013,111 | B2 | 3/2006 | Kuwahara et al. |
| 7,020,436 | B2 | 3/2006 | Schmutz |
| 7,027,773 | B1 | 4/2006 | McMillin |
| 7,039,418 | B2 | 5/2006 | Amerga et al. |
| 7,058,400 | B2 | 6/2006 | Brooks |
| 7,062,224 | B2 | 6/2006 | Baker et al. |
| 7,068,973 | B1 | 6/2006 | Lovinggood et al. |
| 7,075,481 | B2 | 7/2006 | Huston et al. |
| 7,123,911 | B1 | 10/2006 | Ngan |
| 7,139,580 | B2 | 11/2006 | Stein et al. |
| 7,218,275 | B2 | 5/2007 | Han |
| 7,355,993 | B2 | 4/2008 | Adkins et al. |
| 7,457,584 | B2 | 11/2008 | Baker et al. |
| 7,526,247 | B2 | 4/2009 | Baker et al. |
| 7,590,383 | B2 | 9/2009 | Dean et al. |
| 7,778,596 | B2 | 8/2010 | Anderson et al. |
| 7,831,263 | B2 | 11/2010 | Sheynblat et al. |
| 7,924,751 | B2 | 4/2011 | Dean |
| 8,320,825 | B2* | 11/2012 | Goransson et al. ............ 455/7 |
| 2001/0031624 | A1 | 10/2001 | Schmutz |
| 2001/0036833 | A1 | 11/2001 | Koshima et al. |
| 2001/0046878 | A1 | 11/2001 | Chang |
| 2002/0028655 | A1 | 3/2002 | Rosener et al. |
| 2002/0045431 | A1 | 4/2002 | Bongfeldt |
| 2002/0115448 | A1 | 8/2002 | Amerga et al. |
| 2002/0160813 | A1 | 10/2002 | Miya |
| 2002/0167918 | A1 | 11/2002 | Brewer |
| 2003/0008663 | A1 | 1/2003 | Stein et al. |
| 2003/0008669 | A1* | 1/2003 | Stein et al. ............ 455/456 |
| 2003/0023682 | A1 | 1/2003 | Brown et al. |
| 2003/0039267 | A1 | 2/2003 | Koo et al. |
| 2003/0076979 | A1 | 4/2003 | Matsui |
| 2003/0083008 | A1 | 5/2003 | Baker et al. |
| 2003/0086401 | A1 | 5/2003 | Lee et al. |
| 2003/0123401 | A1 | 7/2003 | Dean |
| 2003/0125045 | A1 | 7/2003 | Riley et al. |
| 2003/0151506 | A1 | 8/2003 | Lucketti |
| 2003/0162550 | A1* | 8/2003 | Kuwahara et al. ............ 455/456 |
| 2003/0193992 | A1 | 10/2003 | Challa et al. |
| 2003/0220075 | A1 | 11/2003 | Baker et al. |
| 2004/0001464 | A1 | 1/2004 | Adkins et al. |
| 2004/0006696 | A1 | 1/2004 | Shin et al. |
| 2004/0012086 | A1 | 1/2004 | Infantolino et al. |
| 2004/0028003 | A1 | 2/2004 | Diener et al. |
| 2004/0073916 | A1 | 4/2004 | Petrovic et al. |
| 2004/0095733 | A1 | 5/2004 | Cheng et al. |
| 2004/0097190 | A1 | 5/2004 | Durrant et al. |
| 2004/0162086 | A1 | 8/2004 | Han |
| 2004/0176026 | A1 | 9/2004 | Gainey et al. |
| 2004/0203864 | A1 | 10/2004 | DiBuduo |
| 2004/0212518 | A1 | 10/2004 | Tajima et al. |
| 2006/0046642 | A1 | 3/2006 | Bassiri et al. |
| 2007/0052560 | A1 | 3/2007 | Van Der Veen et al. |
| 2009/0053993 | A1 | 2/2009 | Baker et al. |
| 2011/0305172 | A1 | 12/2011 | Dean |

FOREIGN PATENT DOCUMENTS

| | | |
|---|---|---|
| EP | 0840533 A2 | 5/1998 |
| EP | 0851695 A2 | 7/1998 |
| EP | 0924878 A2 | 6/1999 |
| EP | 0935356 A2 | 8/1999 |
| EP | 1093273 A1 | 4/2001 |
| EP | 1195920 A1 | 4/2002 |
| EP | 1207404 | 5/2002 |
| GB | 62378614 A | 2/2003 |
| JP | 04-095791 | 3/1992 |
| JP | 2000055492 A | 2/2000 |
| JP | 2000505251 T | 4/2000 |
| JP | 2001128208 A | 5/2001 |
| JP | 2001209891 | 8/2001 |
| JP | 2006-512874 | 4/2006 |
| KR | 20030082363 A | 10/2003 |
| KR | 20030088511 | 11/2003 |
| WO | 0588598 A1 | 3/1994 |
| WO | WO9613103 A1 | 5/1996 |
| WO | 9706648 | 2/1997 |
| WO | 9732445 | 9/1997 |
| WO | 9927747 | 6/1999 |
| WO | WO0064091 A2 | 10/2000 |
| WO | 0133302 | 5/2001 |
| WO | WO0150635 | 7/2001 |
| WO | 199444 | 12/2001 |
| WO | 217669 | 2/2002 |
| WO | WO0233996 A1 | 4/2002 |
| WO | 02059638 | 8/2002 |
| WO | 02087275 | 10/2002 |
| WO | WO 03036824 A1 | 5/2003 |
| WO | WO03044970 A2 | 5/2003 |
| WO | WO03061202 A1 | 7/2003 |
| WO | WO03093859 A1 | 11/2003 |
| WO | WO2004095733 | 11/2004 |

OTHER PUBLICATIONS

International Search Report—International Search Authority—PCT/US04/13203—Nov. 3, 2005.
International Search Report—International Search Authority—PCT/US03/36083—Apr. 14, 2004.
Written Opinion—PCT/US04/013202, ISA/US Alexandria, VA Oct. 12, 2004.
International Preliminary Examination Report—PCT/US04/013202, IPEA/US, Alexandria, VA Feb. 3, 2006.
Supplementary European Search Report—EP04750874, Munich Patent Office, Nov. 6, 2009.
Bavafa, et al., Repeaters for CDMA Systems, 48th IEEE Vehicular Technology Conference, 1998, VTC 98, May 18-21, 1998, vol. 2, pp. 1161-1165.
European Search Report—EP07003152, Search Authority—Munich Patent Office—Oct. 11, 2007.

International Preliminary Examination Report—PCT/US02/034332, IPEA/US, Jul. 28, 2004.
International Preliminary Examination Report—PCT/US02/037408, IPEA-US, Oct. 17, 2006.
International Preliminary Examination Report—PCT/US03/036083, IPEA/US, Apr. 29, 2005.
International Preliminary Examination Report—PCT/US03/038803, IPEA-US, Jul. 28, 2004.
International Preliminary Report on Patentability—PCT/US03/000495, IPEA/US, Jan. 17, 2006.
International Preliminary Report on Patentability—PCT/US04/013203, IPEA/US, Alexandria, VA Dec. 8, 2005.
International Preliminary Report on Patentability—PCT/US06/001286, International Bureau of WIPO—Geneva, Switzerland, Jul. 17, 2007.
International Preliminary Report on Patentability, PCT/US2005/020091, The International Bureau of WIPO, Geneva, Switzerland, Jan. 30, 2007.
International Search Report—PCT/US02/034332, International Search Authority—European Patent Office, Mar. 6, 2003.
International Search Report—PCT/US03/000495, International Search Authority—European Patent Office, May 30, 2003.
International Search Report—PCT/US03/038803, International Search Authority—US, Apr. 9, 2004.
International Search Report—PCT/US04/013202, ISA/US, Alexandria, VA Oct. 12, 2004.
International Search Report—PCT/US04/013203, International Search Authority/US, Alexandria, VA Sep. 29, 2004.
International Search Report—PCT/US06/001286, International Search Authority—European Patent Office, May 31, 2006.
International Search Report, PCT/US02/037408, International Search Authority, European Patent Office, Dec. 30, 2004.
International Search Report, PCT/US2005/020091, International Searching Authority,European Patent Office, Jul. 9, 2005.
Simon, et al., "Spread Spectrum Communications Handbook," Revised Edition, McGraw-Hill, 1994, ISBN 0-07-057629-7, pp. 11-12.
TIA/EIA/IS-95, Mobile Station-Base Station Compatibility Standard For Dual-Mode Wideband Spread Spectrum Cellular System, Jul. 1993, Sections 6-25-6-26.
TIA/EIA/IS-98-A; "Recommended Minimum Performance Standards for Dual-Mode Wideband Spread Spectrum Cellular Mobile Stations," Telecomunications Industry Association, Jul. 1996.
Written Opinion—PCT/US02/034332, IPEA/US, Aug. 20, 2003.
Written Opinion—PCT/US03/000495, IPEA/US, Oct. 28, 2005.
Written Opinion—PCT/US03/036083, IPEA/US, Jul. 16, 2004.
Written Opinion—PCT/US04/013203, ISA/US, Alexandria, VA Sep. 29, 2004.
Written Opinion—PCT/US06/001286, International Search Authority—European Patent Office, May 31, 2006.
Written Opinion, PCT/US2005/020091, International Searching Authority, European Patent Office, Jul. 9, 2005.
Translation of Office Action in Japanese application 2005-507153, corresponding to U.S. Appl. No. 10/703,131, citing JP2001-209891 and WO01033302. Dated May 24, 2009.
Translation of Office Action in Korean application 2007-7004427, corresponding to U.S. Appl. No. 10/903,808, citing KR2003-82363. Dated Jun. 19, 2008.
Translation of Office Action in Korean application 2007-7018227, corresponding to U.S. Appl. No. 11/033,597, citing KR2003-00885511. Dated Mar. 25, 2009.

* cited by examiner

REPEATER THAT REPORTS DETECTED NEIGHBORS

This application claims priority from PCT International Application number US2004/013202, and from U.S. provisional patent application Ser. Nos. 60/424,821 and 60/436,393.

RELATED APPLICATIONS

This application claims priority to U.S. Provisional No. 60/559,545, filed on Apr. 5, 2004.

TECHNICAL FIELD

The disclosure relates to wireless communication and, more particularly, wireless communication systems that make use of repeaters.

BACKGROUND

In a wireless communication system, base stations typically provide network access to subscriber units. A subscriber unit generally refers to a mobile wireless device used by an end user, such as a mobile radiotelephone. Base stations are generally stationary equipment that wirelessly communicate with the subscriber units to provide the subscriber units with access to a wired telecommunication network. For example, the base stations may provide an interface between the subscriber units and a public switched telephone network (PSTN) such that telephone calls can be routed to and from the subscriber units. Alternatively or additionally, the base stations may be coupled to a packet-based network for transmission of packet-based voice information or packet-based data.

In some areas, repeaters are installed in a wireless communication system in order to extend network coverage associated with one or more of the base stations. A repeater generally refers to a network device that receives signals from a base station, and retransmits substantially the same signals to the subscriber units. In some cases, repeaters may be wired to the base station, e.g., via a fiber optic link, and in other cases, repeaters are completely wireless. Wireless repeaters typically receive a signal, amplify the signal, and then retransmit the amplified signal to the subscriber units.

Repeaters are commonly considered a cost-effective mechanism for extending or improving network coverage. In particular, the use of repeaters can effectively broaden the geographical coverage area associated with a given base station. Moreover, the cost of implementing a repeater can be significantly less than the cost of adding an additional base station. Implementing repeaters in a wireless communication system, however, raises a number of challenges and potential difficulties.

SUMMARY

In one embodiment, this disclosure is directed to a method comprising receiving information in a wireless communication system, the information being indicative of signals of a set of base stations that a repeater can detect in the wireless communication system, and updating a neighbor list based on the received information.

In another embodiment, this disclosure is directed to a method executed in a repeater of a wireless communication system. The method comprises identifying signals associated with a set of base stations that the repeater can detect, and sending information indicative of the set of base stations to a specific base station that gets repeated by the repeater.

Various embodiments are directed to a repeater, a base station control device, methods implemented in the repeater or the base station control device, and wireless communication systems that include the repeater, one or more base stations and a base station control device. In some cases, the techniques described herein may be implemented as software within a repeater or base station control device. Accordingly, this disclosure also contemplates computer readable media comprising computer readable instructions that, when executed, perform one or more of the techniques described herein.

The details of one or more embodiments of this disclosure are set forth in the accompanying drawings and the description below. Other features, objects, and advantages of this disclosure will be apparent from the description and drawings, and from the claims.

DETAILED DESCRIPTION

Figure 1:
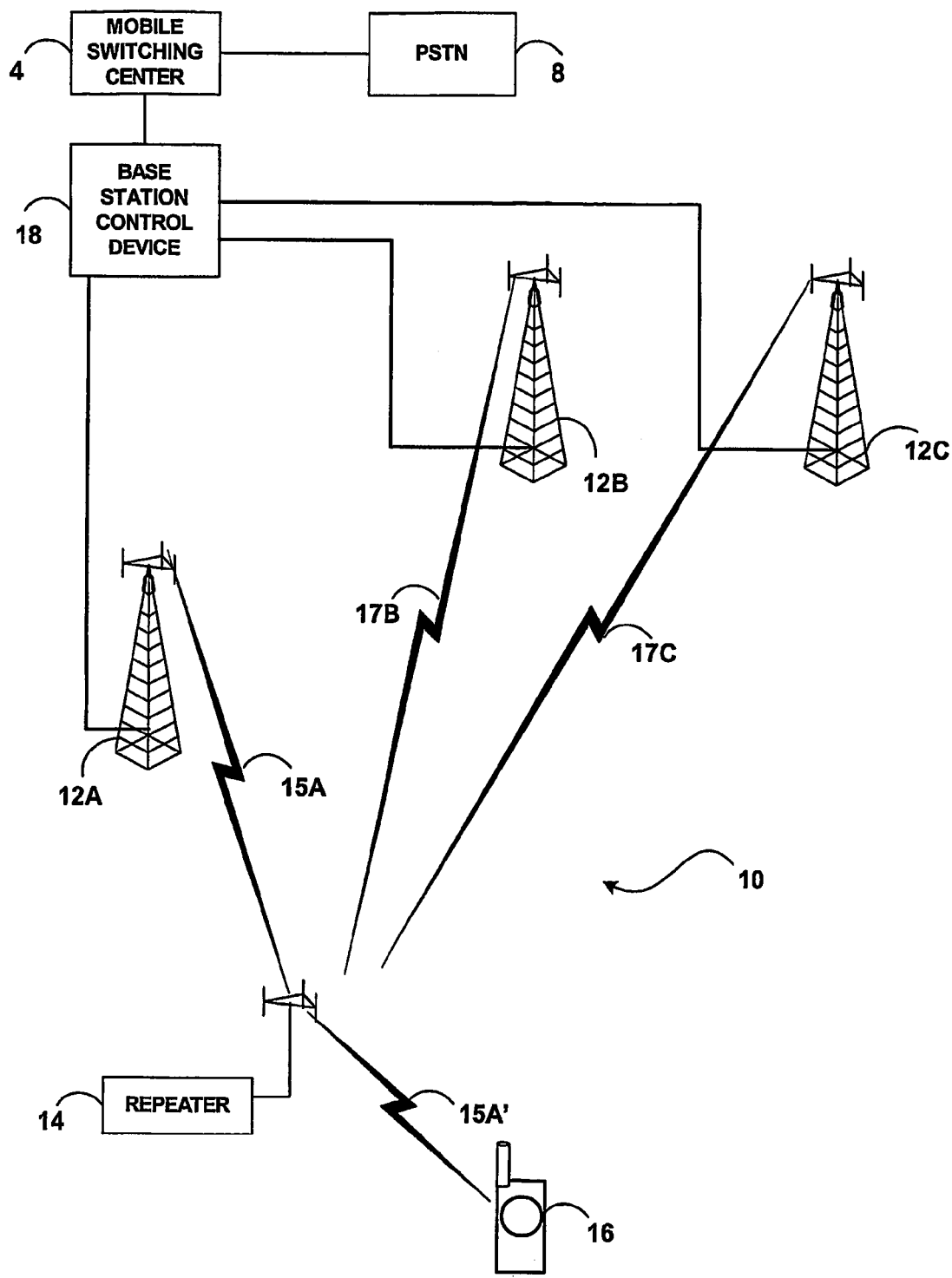
FIG. 1 is a system diagram of a wireless communication system capable of implementing one or more aspects of this disclosure.

In general, this disclosure is directed to a repeater implemented in a wireless communication system, and a base station control device that uses information identified by the repeater. The repeater includes a control unit capable of detecting signals sent from various base stations in the wireless communication system. In accordance with this disclosure, the repeater identifies a set of base stations that it can detect, and then sends information indicative of the set of base stations that the repeater can detect to a specific base station associated with the repeater. The specific base station associated with the repeater generally refers to a base station that sends signals that get repeated by the repeater, i.e., the a base station that gets repeated by the repeater. The base station sends the information received from the repeater to a base station control device, which makes use of the information as described below.

By way of example, in a code division multiple access (CDMA) system, the repeater can search for pilot symbols in every possible pseudo-random noise (PN) offset defined by the CDMA system. If pilot symbols are detected at a particular PN offset, the repeater can send information indicating the detection of pilot symbols in that PN offset. In this manner, the repeater can be used to help assess network topology.

When the base station control device receives information from the repeater indicative of the set of base stations that the repeater can detect, e.g. via the base station associated with the repeater, the base station control device can use the information to update its neighbor list. That base station control device can then cause base stations to send updated neighbor lists to one or more subscriber units of the wireless communication system in order to facilitate handoffs. As an additional option, the repeater could also provide additional information such as energy levels, e.g., Ec/Io levels (the energy per chip of the pilot symbols), signal to noise ratios, received signal strength, or the specific pilots that were observed. In other words, the repeater could not only report which base stations that it can detect, but may also report the specific characteristics of the base station signals that it can detect. The base station, in turn can provide this information to a base station control device in order to facilitate improved network control. The base station control device, for example, may use such information to improve "OA & M" (operation, administration and maintenance) of the system.

A handoff refers to a process in which a subscriber unit changes from receiving service from one base station to another base station. In order to facilitate handoffs, the subscriber unit receives a neighbor list from its current base station, and searches for signals of the base stations in the neighbor list. If a signal of a neighboring base station is detected, the subscriber unit will send an indication of detection of the neighboring base station back to its current serving base station. A base station control device which controls the base stations will cause the subscriber unit to "handoff" to the neighboring base station if the signal of the neighboring base station becomes preferred, e.g., in terms of signal strength, or the like. In that case, forward link information will be sent from both base stations for a period of time, unit the handoff is complete. Following a handoff, the subscriber unit would subsequently receive from the neighboring base station, a new neighbor list, which can be searched in order to possibly facilitate another handoff. In this manner, handoffs allow a subscriber unit to change base stations, even during cellular voice or data telephone calls.

The implementation of repeaters can significantly affect neighbor lists because repeaters generally extend the geographical network coverage associated with a given base station. Without repeaters, a neighbor list of a given base station typically includes only those base stations that are within a certain geographical radius of the given base station. However, when a repeater is used, the neighbor list of the base station associated with the repeater should account for the fact that the repeater is extending the network coverage of the base station. In that case, the neighbor list should include additional base stations that are relatively close to the repeater, even if those additional base stations are relatively far from the base station associated with the repeater. In some cases, repeaters are implemented to extend along highways, thereby significantly extending the geographical distance of a base station to the subscriber units it services along narrow geographical bands, e.g., corresponding to the highways.

Conventionally, following implementation of a repeater, a network technician manually surveys the network and updates the neighbor lists of the base station control device based on the presence of the repeater. Such manual updates to neighbor lists, however, are a costly use of human resources. Moreover, if network settings change in the future, the neighbor lists may become inaccurate. For this reason, in accordance with this disclosure, the repeater includes circuitry that allows the repeater to identify signals from various surrounding base stations. Accordingly, the repeater identifies signals of a set of base stations that it can detect, and then sends information indicative of the set of base stations that the repeater can detect to the specific base station associated with the repeater in order to allow for automatic updates of the neighbor list in the base station control device.

FIG. 1 is a system diagram of a wireless communication system 10, including one or more base stations 12A-12C (collectively base stations 12), one or more repeaters 14, and one or more subscriber units 16. Base stations 12 are coupled to a base station control device 18 which generally controls base stations 12. Base station control device 18 may be coupled to a mobile switching center 4. Mobile switching center 4, in turn, may be coupled to a public switching telephone network (PSTN) 8.

Repeater 14 is typically associated with a specific one of base stations 12, in this case, base station 12A. In other words, repeater 14 repeats signals sent from base station 12A. In particular, repeater 14 receives signals 15A from base station 12A, and repeats signals 15A (the repeated signal being labeled 15A') in order to extend network coverage of base station 12A. However, it may also be possible for a repeater 14 to repeat the signals of two or more base stations.

Base stations 12 are generally stationary equipment that wirelessly communicate with subscriber unit 16 in order to provide network access to subscriber unit 16. Base stations 12 can provide an interface between subscriber unit 14 and PSTN 8 such that telephone calls can be routed to and from subscriber unit 16. Again, base station control device 18 controls base stations 12 and interfaces with PSTN 8 via mobile switching center 4. Alternatively or additionally, base stations 12 may be coupled either directly or indirectly to a packet-based network for transmission of packet-based voice information or packet-based data. Base stations 12 are sometimes referred to as base transceiver systems (BTS).

Subscriber unit 16 generally refers to a wireless device used by an end user. Although a single subscriber unit 16 is illustrated, system 10 typically includes a plurality of such units. Subscriber unit 16 typically comprises a mobile radiotelephone. However, subscriber unit 16 may also be implemented in any of a wide variety of other portable computing devices such as a desktop or portable computer, a personal digital assistant (PDA), an interactive television, a wireless data terminal, a wireless data collection device, or any other wireless device.

Repeater 14 comprises a network device that receives signals 15A from a base station 12A and retransmits substantially the same signal 15A' to subscriber unit 16. Alternatively or additionally, repeater 14 may receive signals 15A' from subscriber unit 16 and retransmit substantially the same signal 15A to base station 12A. Although illustrated as a completely wireless device, in other examples, repeater 14 may be wired to base station 12A, e.g., via a fiber optic link, copper wiring or the like. In that case, however, the wired repeater would only hear the attached base station on the donor side, i.e., base station 12A.

In accordance with this disclosure, repeater 14 identifies signals 17B-17C (collectively signals 17) of a set of base stations 12B-12C that it can detect, and then sends information indicative of the set of base stations 12B-12C that repeater 14 can detect to base station 12A that is repeated by repeater 14. Base station 12A, in turn forwards this information to base station control device 18.

For example, if system 10 is a CDMA system, repeater 14 can search for pilot symbols in every possible pseudo-random noise (PN) offset defined by the CDMA system. If pilot symbols are detected at a particular PN offset, repeater 14 sends information to base station 12A indicating the detection of pilot symbols in that PN offset. In this manner, repeater 14 can be used to identify the presence of neighboring base stations or otherwise assess network topology of system 10. The signals 17 detected by repeater 14 may come directly from base stations 12B-12C, as illustrated in FIG. 1, or alternatively, one or more of signals 17 may come from another repeater, e.g., associated with one or more of base stations 12B-12C.

When base station control device 18 receives the information indicative of signals 17 of the set of base stations 12B-12C that repeater 14 can detect, e.g., via base station 12A, base station control device 18 uses the information to update its neighbor list. Base station control device 18 can then cause base station 12A to send the updated neighbor list to subscriber unit 16 and other subscriber units of wireless communication system 10 in order to facilitate handoffs. Also, base station control device 18 may use this information for other purposes such as OA & M purposes. For example, the specific details about the strength and nature of the signals may be useful to base station control device 18 for OA & M purposes.

By using repeater 14 to detect signals 17 of base stations 12B-12C, and then report the signals it detects, system 10 can be significantly improved. For example, the need for a technician to manually survey the topology of network 10, following the implementation of repeater 14 may be reduced or eliminated. Moreover, because repeater 14 detects and reports the actual signals 17 that it detects, the neighbor list may be more accurate than a list generated by a technician's survey. Also, in accordance with this disclosure, the updated neighbor list should account for any network changes that occur, even if they occur after repeater 14 is deployed. For example, if base station 12C temporarily malfunctions, the neighbor list of base station control device 18 can be updated automatically when repeater 14 no longer detects signal 17C. Also, if additional base stations or repeaters are later deployed, the neighbor list of base station control device 18 can be updated automatically when repeater 14 detects new signals associated with the newly deployed base stations or repeaters. In this manner, using repeater 14 to detect signals 17 and then report the signals it detects to base station 12A can improve performance of wireless communication system 10.

Figure 2:
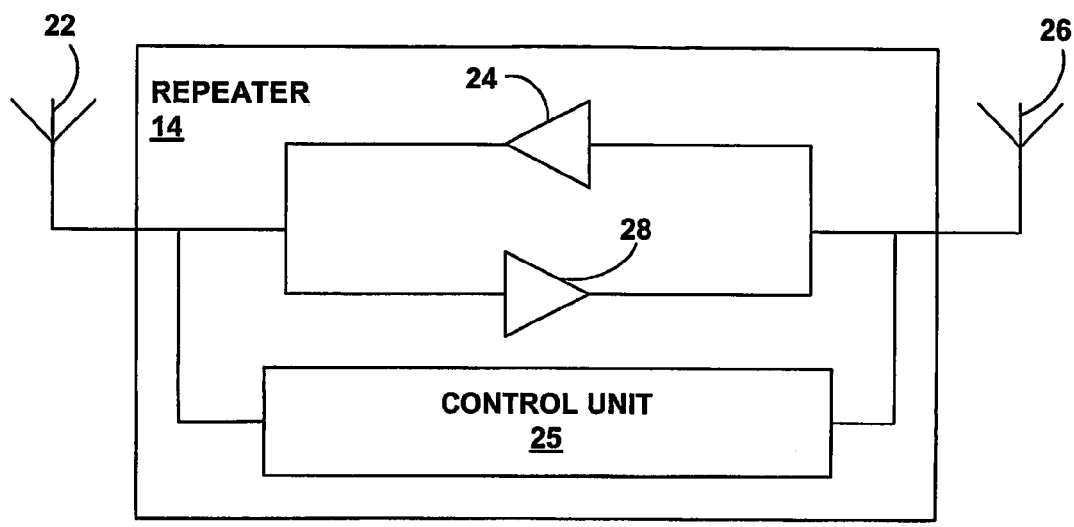
FIG. 2 is a block diagram of a repeater according to an exemplary embodiment of this disclosure.

FIG. 2 is a block diagram of an exemplary repeater 14. In FIG. 2, the illustrated components include specific components that can be used in accordance with the teaching of this disclosure. However, other components may also exist, e.g., in order to control other repeater functions. In this example, repeater 14 includes a first antenna 22 (sometimes referred to as a "donor" antenna) to receive signals from base station 12A, and a first amplifier 24 to amplify the signals received at first antenna 22. In addition, repeater 14 includes a second antenna 26 (sometimes referred to as a "server" antenna) to transmit, i.e., to repeat, the signals received by first antenna 22 and amplified by amplifier 24. Also, repeater 14 may include a second amplifier 28 to amplify signals received at second antenna, e.g., from subscriber unit 16. In that case, first antenna 22 transmits, i.e., repeats, the signals received at second antenna 26.

In accordance with this disclosure, repeater 14 further includes a control unit 25. For example, control unit 25 may comprise a digital signal processor (DSP) executing software modules, a programmable microprocessor, or discrete hardware components. Also, control unit 24 may be implemented in any combination of hardware, software, firmware, one or more programmable microprocessors, digital signal processors, or the like. In one example, control unit 24 comprises a DSP or chip-set similar to those typically implemented in subscriber units. In that case, the DSP can be programmed to perform the signal processing techniques of repeater 14 as described herein. The various components of repeater 14 are illustrated for purposes of explanation, but may be integrated with other components, e.g., within hardware or software. If the techniques described herein are implemented in software, a memory or other computer-readable medium (not shown) may be coupled to control unit 25 in order to store the software instructions loaded into control unit 25 for execution. If the techniques are executed in digital, repeater 14 would typically include an analog-to-digital converter (not shown) to convert received signals to digital values, which can be processed by control unit 25, e.g., in the form of a DSP.

In any case, control unit 25 examines incoming signals received at antenna 22 in order to identify signals 17 (FIG. 1) received from various neighboring base stations 12B-12C. In particular, control unit 25 detects signals 17 and then generates information indicative of detected signals 17 associated with neighboring base stations 12B-12C. For example, control unit 25 may scan received signals for the presence of pilot symbols at different PN offsets, e.g., which correspond to signals 17. Alternatively, control unit 25 may identify network identification (ID) codes from received signals, e.g., obtained from overhead channels of respective signals 17. In any case, control unit 25 then causes repeater 14 to transmit the generated information indicative of detected signals 17 associated with neighboring base stations 12B-12C to base station 12A. Base station 12A, then forwards this information to base station control device 18 so that its neighbor list can be updated. Again, signals 17 associated with neighboring base stations 12B-12C may come directly from base stations 12B-12C, as illustrated in FIG. 1, or alternatively, one or more of signals 17 may come from another repeater, e.g., associated with one or more of base stations 12B-12C.

In one example, where system 10 comprises a CDMA system, control unit 25 examines received signals 17 and searches for pilot symbols in possible pseudo-random noise (PN) offsets defined by the CDMA system. If pilot symbols are detected at a particular PN offset, control unit 25 identifies the presence of pilot symbols, and causes repeater 14 to send information to base station 12A indicating the detection of pilot symbols in that particular PN offset. In this manner, control unit 25 of repeater 14 can be used to help identify the presence of base stations 12B-12C, or otherwise assess network topology of system 10, e.g., for the purpose of updating the neighbor list of base station control device 18.

Figure 3:
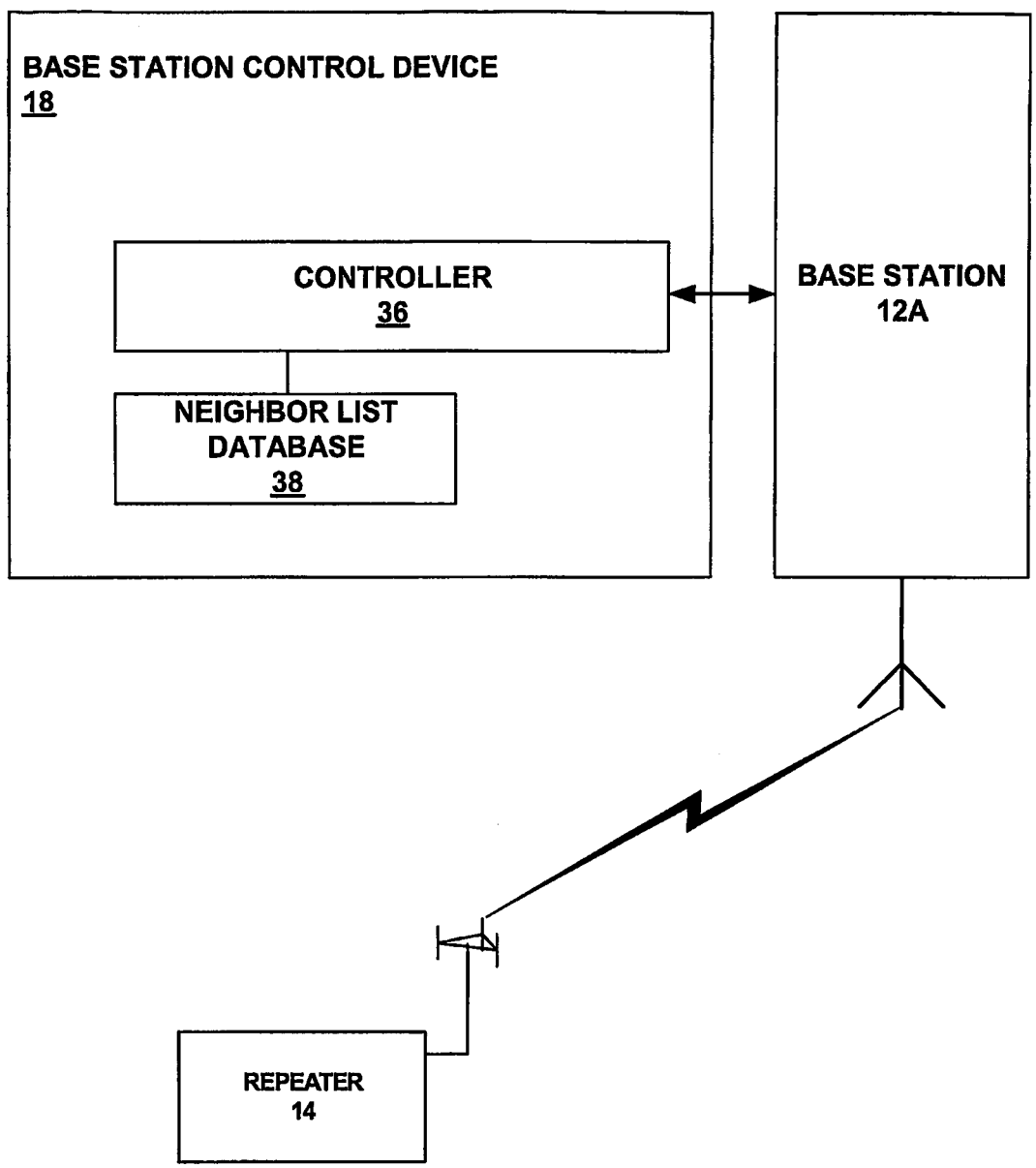
FIG. 3 is a block diagram of a portion of the wireless communication system shown in FIG. 1, illustrating an exemplary base station control device in more detail.

FIG. 3 is a block diagram of a portion of system 10, illustrating an exemplary base station control device 18 in more detail. In FIG. 3, the illustrated components of base station control device 18 are specifically those components used in receiving information and updating neighbor lists in accordance with this disclosure. Numerous other components exist in base station control device 18 for other functions, such as for OA & M purposes. For simplicity, however, the additional components are not illustrated.

As shown in FIG. 3, base station control device 18 includes a controller 36, and a neighbor list database 38. Neighbor list database 38 stores a list of base stations that are considered neighbors to base station 12A in the context of handoffs. Controller 36 periodically fetches the neighbor list from database 38 and causes base station 12A to broadcast the neighbor list to various subscriber units currently registered through base station 12A. The subscriber units, then, use the neighbor list sent from base station 12A to define searches for signals of the neighboring base stations. If necessary, the subscriber units 16 can then perform handoffs to the neighboring base stations identified in the neighbor list.

In accordance with this disclosure, base station 12A receives from repeater 14, information indicative of signals 17 from a set of base stations 12B-12C that repeater 14 can detect (see FIG. 1). The information sent from repeater 14 is then forwarded from base station 12A to base station control device 18. Controller 36 of base station control device 18 uses the information to update its neighbor list maintained in neighbor list database 38.

By updating the neighbor list of base station control device 18 maintained in neighbor list database 38 based on information identified by repeater 14, the performance of system 10 can be improved. In particular, the information indicative of signals 17 received from a set of base stations 12B-12C that repeater 14 can detect, allows base station control device 18 to update its neighbor list maintained in neighbor list database 38 in order to account for the fact that base stations 12B-12C are within the coverage area of base station 12A by virtue of the presence of repeater 14. Then, when base station 12A is caused to broadcast its neighbor list, other subscriber units will know to search for base stations 12B-12C in order to facilitate handoffs. Moreover, if network topology changes, e.g., by the addition of other base stations or repeaters, or the elimination or malfunction of base stations or repeaters, repeater 14 will send new information to base station 12A identifying the absence or addition of base station signals in system 10, which allows the neighbor list of base station control device 18 to be adjusted accordingly. In this manner, operation of the various devices of system 10 can be improved.

Figure 4:
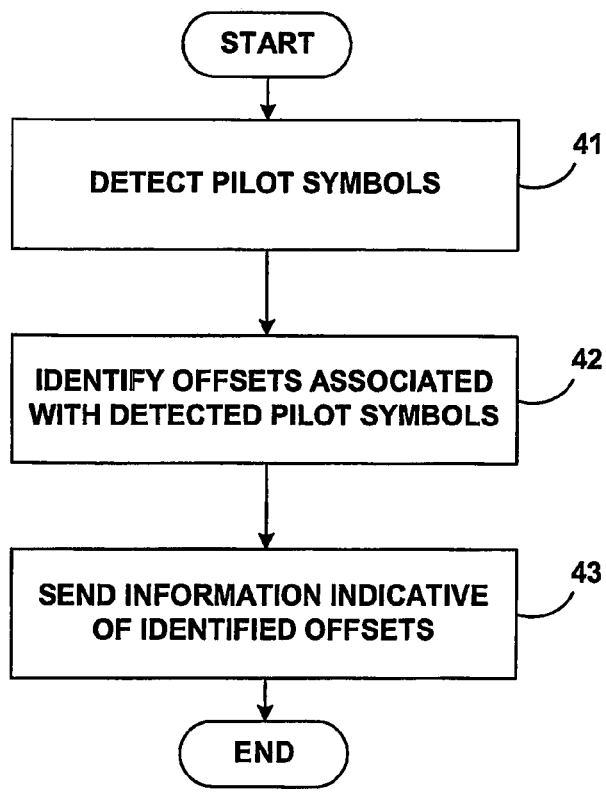
FIG. 4 is a flow diagram illustrating exemplary operation of a repeater according to an embodiment of this disclosure.

FIG. 4 is a flow diagram illustrating exemplary operation of repeater 14 according to an embodiment of this disclosure. As shown in FIG. 4, control unit 25 of repeater 14 detects pilot symbols, e.g., within signals 17 sent from base stations 12B-12C (41). Then, control unit 25 identifies offsets associated with the various detected pilot symbols (42). For example, if system 10 comprises a CDMA system, control unit may identify PN offsets of the various pilot symbols, relative to system time. In that case, the PN offsets define the proper search times that can be subsequently used by various subscriber units in searching for the pilot symbols of base stations 12B-12C.

Alternatively, control unit 25 may identify ID codes associated with base stations 12B-12C. In any case, control unit 25 then causes repeater 14 to send information indicative of the identified offsets to base station 12A (43). Accordingly, base station 12A can forward the information to base station control device 18 so that the neighbor list can be updated. The process illustrated in FIG. 4 can eliminate or reduce the need for a technician to manually update the neighbor lists of base station control device 18, following implementation of repeater 14. Moreover, the process of FIG. 4 can allow for automatic and dynamic adjustments to the neighbor list, e.g., in response to the addition, elimination or malfunction of base stations or repeaters within system 10.

Figure 5:
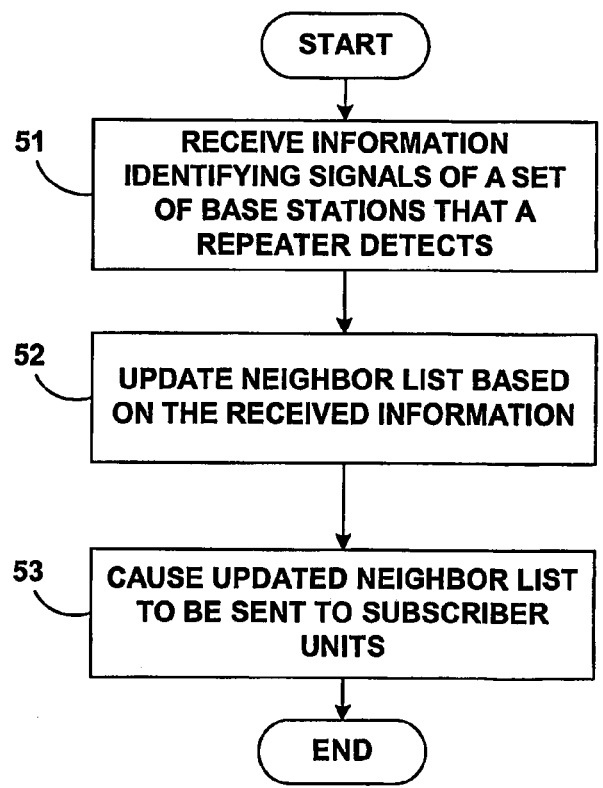
FIG. 5 is a flow diagram illustrating exemplary operation of a base station control device according to an embodiment of this disclosure.

FIG. 5 is a flow diagram illustrating exemplary operation of base station control device 18 according to an embodiment of this disclosure. As shown in FIG. 5, base station control device 18 receives information identified by repeater 14 indicative of signals 17 of a set of base stations 12B-12C that repeater 14 can detect (51). Controller 36 updates a neighbor list stored in neighbor list data base 38 based on the received information (52).

Once the neighbor list has been updated (52), controller 36 causes base station 12A to send the updated neighbor list to various subscriber units (53). Once the updated neighbor list is sent to various subscriber units, those subscriber units can use the updated neighbor list to facilitate searches and handoffs. Importantly, because the neighbor list is updated based on information identified by repeater 14 indicative of signals 17 of set of base stations 12B-12C that repeater 14 can detect, the subscriber units will search for signals 17, and possibly perform handoffs to one of base stations 12B-12C.

Various embodiments of the have been described. In particular, a wireless communication system has been described in which a repeater in the system identifies signals of a set of base stations that the repeater can detect. In accordance with this disclosure, the signals of a set of base stations that the repeater can detect may come directly from the different base stations, e.g., as illustrated in FIG. 1, or may alternatively come from other repeaters associated with the various base stations.

After identifying signals of a set of base stations that the repeater can detect, the repeater then reports information indicative of the signals to a specific base station associated with the repeater. The base station then forwards this information to a base station control device, which updates its neighbor list based on the information it receives from the repeater. Updated neighbor lists can then be sent to subscriber units. The subscriber units can use the updated neighbor list to search for neighboring base stations for the purpose of facilitating handoffs.

The techniques described herein may be implemented in a subscriber unit or base station in hardware, software, firmware, or the like. Example hardware implementations include implementations within a digital signal processor (DSP), an application specific integrated circuit (ASIC), a field programmable gate array (FPGA), a programmable logic device, specifically designed hardware components, or any combination thereof. In addition, one or more of the techniques described herein may be partially or wholly executed in software. In that case, a computer readable medium may store or otherwise comprise computer readable instructions, i.e., program code, that can be executed by a processor or DSP of a subscriber unit or base station to carry out one of more of the techniques described above.

For example, the computer readable medium may comprise random access memory (RAM), read-only memory (ROM), non-volatile random access memory (NVRAM), electrically erasable programmable read-only memory (EEPROM), flash memory, or the like. The computer readable medium can be coupled to control unit 24 of subscriber unit 16, or coupled to controller 36 of base station control device 18. In those cases, control unit 24 or controller 36 may comprise a processor or DSP that executes various software modules stored in the computer readable medium.

Numerous other modifications may be made without departing from the spirit and scope of this disclosure. For example, although many of the techniques have been described in the context of CDMA systems, the techniques may also be applicable to other systems such as time division multiple access (TDMA) systems, frequency division multiple access (FDMA) systems, systems such as the global system for mobile communication (GSM) that use combinations of TDMA and FDMA techniques, or the like. Also, neighbor lists have been described as being stored in base station control device 18, they could alternatively be stored and updated in other devices of a wireless communication system, such as within base stations 12 or within mobile switching center 4, or a similar device. Accordingly, these and other embodiments are within the scope of the following claims.

The invention claimed is:

1. A method comprising:
   receiving information in a wireless communication system from a repeater through a base station of a set of base stations, the information being indicative of signals of said set of base stations detectable by said repeater, wherein the information identifies a set of phase offsets detected from the signals of the set of base stations; and
   updating a neighbor list based on the received information.

2. The method of claim 1, further comprising initiating transmission of the updated neighbor list to one or more subscriber units of the wireless communication system.

3. The method of claim 1, wherein the information includes identification codes detected from the signals of the set of base stations.

4. The method of claim 1, wherein the wireless communication system comprises a code division multiple access (CDMA) system and the information identifies pseudorandom noise (PN) offsets.

5. A method performed by a repeater of a wireless communication system, the method comprising:
identifying signals associated with a set of base stations that the repeater can detect; and
sending information indicative of the set of base stations from the repeater to a base station that is repeated by the repeater, wherein the information identifies a set of phase offsets detected from the signals of the set of base stations.

6. The method of claim 5, wherein the information includes identification codes detected from the signals of the set of base stations.

7. The method of claim 5, wherein the wireless communication system comprises a code division multiple access (CDMA) system and the information identifies pseudorandom noise (PN) offsets.

8. The method of claim 5, further comprising identifying energy levels of the signals and sending information indicative of the energy levels.

9. The method of claim 5, further comprising identifying pilot symbols of the signals and sending information indicative of the identified pilot symbols.

10. A computer readable medium comprising computer readable instructions executable by a device of a wireless communication system to update a neighbor list based on information received from a repeater in the wireless communication system, the information being indicative of signals of a set of base stations detectable by the repeater, wherein the information identifies a set of phase offsets detected from the signals of the set of base stations, the information to be received from the repeater through a base station of the set of base stations.

11. The computer readable medium of claim 10, further comprising instructions executable by the device to send the updated neighbor list to one or more subscriber units of the wireless communication system.

12. The computer readable medium of claim 10, wherein the information includes identification codes detected from the signals of the set of base stations.

13. The computer readable medium of claim 10, wherein the wireless communication system comprises a code division multiple access (CDMA) system and the information identifies pseudo-random noise (PN) offsets.

14. A computer readable medium comprising computer readable instructions executable by a repeater of a wireless communication system to:
identify signals associated with a set of base stations that the repeater can detect; and
send information indicative of the set of base stations to a base station that is repeated by the repeater, wherein the information identifies a set of phase offsets detected from the signals of the set of base stations.

15. The computer readable medium of claim 14, wherein the information includes identification codes detected from the signals of the set of base stations.

16. The computer readable medium of claim 14, wherein the wireless communication system comprises a code division multiple access (CDMA) system and the information identifies pseudo-random noise (PN) offsets.

17. A device of a wireless communication system, the device comprising:
a receiver to receive information in the wireless communication system, the information being indicative of signals from a set of base stations detectable by a repeater in the wireless communication system, the information to be received from the repeater through a base station of the set of base stations, wherein the information identifies a set of phase offsets detected from the signals of the set of base stations; and
a control unit to update a neighbor list based on the received information.

18. The device of claim 17, further comprising a transmitter to send the updated neighbor list to the base station for transmission to one or more subscriber units of the wireless-communication system.

19. The device of claim 17, wherein the information includes identification codes detected from the signals of the set of base stations.

20. The device of claim 17, wherein the wireless communication system comprises a code division multiple access (CDMA) system and the information identifies pseudorandom noise (PN) offsets.

21. A repeater of a wireless communication system comprising a control unit to identify signals associated with a set of base stations detectable by the repeater and to direct the repeater to send information indicative of the set of base stations to a base station that is repeated by the repeater, wherein the information identifies a set of phase offsets detected from the signals of the set of base stations.

22. The repeater of claim 21, where in the information includes identification codes detected from the signals of the set of base stations.

23. The repeater of claim 21, wherein the wireless communication system comprises a code division multiple access (CDMA) system and the information identifies pseudorandom noise (PN) offsets.

24. A wireless communication system comprising:
a repeater to identify signals associated with a set of base stations detectable by the repeater, and to send information indicative of the set of base stations detectable by the repeater to a base station of the set of base stations, wherein the information identifies a set of phase offsets detected from the signals of the set of base stations; and
a device to receive the information through the base station of the set of base stations and to update a neighbor list based on the information.

25. The system of claim 24, wherein the information includes identification codes detected from the signals of the set of base stations.

26. The system of claim 24, wherein the wireless communication system comprises a code division multiple access (CDMA) system and the information identifies pseudorandom noise (PN) offsets.

27. A device of a wireless communication system comprising:
means for receiving information in the wireless communication system, the information being indicative of signals from a set of base stations detectable by a repeater in the wireless communication system, the information to be received from the repeater through a base station of the set of base stations repeater, wherein the information identifies a set of phase offsets detected from the signals of the set of base stations;

means for storing a neighbor list; and means for updating the neighbor list based on the received information.

28. The device of claim 27, further comprising means for sending the neighbor list to one or more subscriber units of the wireless communication system.

29. A repeater of a wireless communication system comprising:

means for identifying signals associated with a set of base stations that the repeater can detect; and means for sending information indicative of the set of base stations to a base station that gets repeated by the repeater, wherein the information identifies a set of phase offsets detected from the signals of the set of base stations.

30. The repeater of claim 29, wherein the wireless communication system comprises a code division multiple access (CDMA) system and the information identifies pseudorandom noise (PN) offsets.

\* \* \* \* \*